United States Patent Office 3,425,841
Patented Feb. 4, 1969

3,425,841
PINEAPPLE-GRAPEFRUIT FRUIT JUICE BLEND
Reginald L. Handwerk, San Jose, and Lyle Allen, Los Gatos, Calif., assignors to Castle & Cooke, Inc., Honolulu, Hawaii, a corporation of Hawaii
No Drawing. Filed Jan. 7, 1966, Ser. No. 519,010
U.S. Cl. 99—105           8 Claims
Int. Cl. A23l 1/02

ABSTRACT OF THE DISCLOSURE

A colored pineapple-grapefruit juice blend having a pH of between 3.1 and 4.2 containing F.D. & C. #3 (erythrosine) as colorant.

---

This invention relates to a novel, colored fruit juice blend. More particularly the invention pertains to an acidic blend of fruit juices suitable for packaging in tin-lined containers and having a distinguishing or characteristic color and selected flavor.

In recent years blends of fruit juices, as for example pineapple and grapefruit juices, have been extensively marketed. This type of product has grown in consumer popularity due, among other things, to its unique, palatable flavor. It has now been found that a particularly desirable blend of this type possessing enhanced flavor may be produced by suitably proportioning and mixing fruit juices, such as pineapple juice and the juice of pink or the conventional white grapefruit, and this blend may be characterized by a color which, in the case of the pineapple-grapefruit juice blend, may be similar to the color of the flesh of pink grapefruit.

A major object of this invention is to produce a novel fruit juice blend to which is imparted a characteristic color, the acidity of such blend being adjustable to obtain an enhanced flavor.

Another object of this invention is to provide an improved pink colored blend of pineapple and grapefruit juices which retains a characteristic color over prolonged storage periods without substantial, noticeable loss of flavor.

A further object of this invention is to provide an acidic fruit juice blend having a pH of less than 4.2 to which is imparted a characteristic color and which maintains a characteristic color after being packaged in tin-lined cans and stored for prolonged periods.

A still further object of this invention is to provide a method for producing an improved colored pineapple-grapefruit blend.

With these and other equally important and related objects in view, the invention comprehends the method and concept of providing a blend of fruit juices, such as pineapple and grapefruit, the acidity of which may be modified to enhance the flavor of the blend while still permitting the addition of a characteristic color to the blend. This blend may then be packaged in tin-lined containers and, after packaging, retains a characteristic color for normal storage periods.

The successful attainment of this invention involves overcoming certain major difficulties which heretofore precluded imparting a characteristic color to the product. First, it will be understood that the natural color of many fruit juice blends is not a color which might be the most desirable from a marketing standpoint. For example, it may be desirable to market a pink grapefruit juice blend, but the juice of pink grapefruit is not pink but practically white. The pink color for which this species of grapefruit is distinguished is derived from a water insoluble pigment within the flesh of the fruit, which is not removed with the expressed juice but which remains in the pulp. To attain the desirable pink color for a pink grapefruit juice blend, it is necessary to utilize a color addition agent or dye, and the choice of such color additive is restricted by U.S. Government regulations. Marketing considerations and consumer acceptance require that the fruit juice blend have a pleasing flavor and the packaged or canned juice blend must also retain a characteristic color over the normal shelf storage periods. As will be seen subsequently, this necessity of improving color stability of the packaged product imposes serious limitations on the choice of the coloring agent used.

It is well recognized in the art that in order to maintain the original desirable flavor of the blend it is necessary to package the product in a tin-lined can and not in an enameled tin-lined can. It has been found through experience in this field that the enameled tin-lined can undesirably affects the flavor of the packaged product during storage.

The requirement for packaging such acidic fruit juice blends in tin-lined containers presents problems with respect to coloring which are difficult to overcome. It is well known that certain colors or dyes added to fruit juice products are unstable and tend to fade during storage of the product. This color instability in such canned products appears to be due either to the action of ascorbic or other acid normally present in such juice products or to the action of metallic ions present, or to a combination of these factors. For example, in the course of research in devising the present invention it was ascertained that when the certified color, F.D. & C. Red No. 2 (amaranth) was added to a blend of pineapple juice and grapefruit juice of the type contemplated herein, the dye bleached out in a relative short period and the blend ultimately became colorless. It was found that this dye could be used effectively in such pineapple-grapefruit juice blends only when the product was packaged in enameled tin-lined cans. As pointed out above, this type of packaging is undesirable because it is well established that such type of container has an adverse effect on the flavor of the canned product.

The certified color F.D. & C. Red. No. 3 (erythrosine) is known to possess a greater stability with respect to ascorbic acid than does F.D. & C. Red No. 2 and presumably might function effectively as a coloring agent in an acidic fruit juice blend. However, it has long been recognized by color chemists that this dye is insoluble in aqueous acid solutions at a pH below 4.2. As ascorbic and other acids are often added to fruit juice blends to achieve the most desirable flavor, it has heretofore been considered impractical to sacrifice flavor in order to achieve a workable pH, and F.D. & C. Red No. 3 has been discounted as a usable coloring agent.

In the past it has been suggested that the certified colors used in fruit drinks containing ascorbic acid and possible metallic ions might be protected or stabilized by utilizing agents such as different forms of EDTA. Another suggestion advanced for coloration of fruit juices has been the incorporation of stable plant pigments such as the red varieties of the carotenoids. Each of these expedients is unsatisfactory in that it involves additional manipulation and expense in producing the commercial canned juice blend.

In the course of extensive experimentation and research with blends of pineapple and grapefruit juice, applicants have found that blends of pineapple and grapefruit juice could be developed having a pH well below pH 4.2 and that yet a characteristic color could be imparted to these blends effectively by incorporating a selected am ount of erythrosine in the blend. Products thus produced have been packaged in tin-lined cans and have been found to satisfactorily retain their flavor and color over storage periods of many months under ambient temperature conditions.

In view of the previously noted accepted fact that F.D. & C. Red No. 3 is insoluble in acid solutions at a pH below 4.2, this discovery is completely contra-indicated by the prior art. No attempt is made to explain this peculiar and unexpected solubility of erythrosine in the acidic liquid environment employed with this invention. It is possible that the solubility of this dye in the described special juice blend may be modified by a type of peptizing action of colloidal constituents of the juice blend or by some type of complexing of the dye with components of the blend. Whatever the particular mechanism of this desirably modified solubility may be, it is a fact, abundantly established by tests, that in a juice blend of the type contemplated by the invention, this dye is completely soluble at a pH of between 3.1 to 3.6 and higher, and that a characteristic color is maintained during the normal storage period of the canned blend.

In view of the foregoing unexpected finding, it is apparent that acidic fruit juice blends satisfying the strict criteria of the invention may be readily and economically produced. These products, characterized by retention of flavor and color, may be packaged in tin-lined containers by conventional techniques to provide a desirable and characteristically novel fruit juice beverage.

Using as an example a pineapple-grapefruit juice blend, it will be understood by those skilled in the art that the flavor, sweetness and acidity of the blend may be modified and controlled by adjustment of the proportions of the juice components, the quantity of added sweetening and acidic agents and the like. As is well known, the quality of grapefruit and pineapple varies with different degrees of maturation during the growing season and with environmental growth conditions. Such variations as sweetness and acidity can readily be determined by tests of the fruit to be processed and adjustments by addition of sweetening or acidic components may readily be made to achieve the desired quality in the blend.

The pineapple juice component of the fruit juice blend formulated in accordance with this invention may comprise pineapple meat juice alone or a combination of meat juice and skin juice. Such juices may be extracted by conventional methods currently employed in the art. The grapefruit juice similarly may be extracted by conventional methods. In the preferred method of producing the novel product of the invention, the extracted juices, as noted, are tested to determine sweetness and acidity and are then preferably separately concentrated.

In formulating the blend, sweetening and acidifying agents are added to bring the blend up to the predetermined degrees of sweetness and acidity. Desirable dietetic factors such as ascorbic acid may be and preferably and incorporated in the blend.

Because of its low cost and ready availability, cane sugar may be used as a sweetening agent, although, if desired, other agents such as dextrose, corn syrup, fructose and the like may be used alone or together with sucrose. The acidic agent employed for adjustment of pH may be any suitable edible acid such as citric, tartaric, fumaric and adipic or selected combinations of these.

In producing the marketable blend, the components comprising the fruit juices, added sugar and acid components, erythrosine solution and any added dietetic compounds are thoroughly blended in any suitable mixing apparatus and the product is packaged. Preferably the blended product is deaerated, flash pasteurized at a suitable temperature, canned in tin-lined cans and quickly cooled.

The following formula is representative and is the presently preferred novel fruit juice blend. This blend, which has a pH of 3.25, has been tested for prolonged periods in tin-lined cans with the desirable results noted previously, namely retention of its original flavor and color.

| | |
|---|---|
| Pineapple concentrate | 61° Brix, 330 grams. |
| Grapefruit concentrate | 58° Brix, 71 grams. |
| Sugar | Approx. 225 grams. |
| Citric acid | Approx. 10 grams. |
| Sodium citrate | Variable to adjust pH to 3.25. |
| Color: U.S. Certified Red #3 (3% sol) | Approx. color sufficient to .035 gm. |
| Vitamin C (to maintain minimum daiy adult requirement) | 30 mg. per 6 oz. |
| Grapefruit oil and/or orange oil | 0.3 ml. |
| Naringen | 1.7 gm. |

Water to make 1 gallon.

It will be understood that the proportions of the respective ingredients such as the ratio of pineapple to grapefruit juice is not critical but may be varied within the desired balance of flavor intensity and sweetness in the ultimate marketed blend. Similarly the degree of concentration of the respective juices may be varied within substantial limits.

It will also be understood that certain other dyes may be employed in selected amounts in the blend to enhance or modify the tinctorial effect of the erythrosine without affecting the flavor of the blend; such additive dyes, for example, may be carotene yellow, yellow No. 5, cochineal, and Carmine.

While a preferred modification of the invention has been described, it will be understood that this is given to illustrate the underlying principles of the invention and not as limiting its useful scope except as such limitations are imposed by the appended claims.

What is claimed:

1. A colored pineapple-grapefruit fruit juice blend of selected flavor comprising fruit juices in proportions balanced to substantially achieve the selected flavor, said blend of fruit juices having a pH of between 3.1 and 4.2, and a sufficient quantity of dissolved erythrosine to impart a selected color to said blend.

2. The colored fruit juice blend of claim 1 which contains edible acidic agents in sufficient quantity to adjust the pH of the blend within the range of pH 3.1–3.6.

3. A colored pineapple-grapefruit juice blend of selected flavor which may be suitably packaged and stored in tin-lined containers comprising pineapple and grapefruit juice in proportions balanced to approximate the selected flavor, sweetening, and edible acidic agents proportioned to adjust the blend to the selected flavor, said blend having a pH of less than 4.2, and a sufficient quantity of dissolved erythrosine to impart a selected color to said blend.

4. The colored pineapple-grapefruit juice blend of claim 3 wherein said acidic agents include a quantity of citric acid and ascorbic acid.

5. The colored pineapple-grapefruit juice blend of claim 3 which contains a variable quantity of a buffering agent sufficient to adjust the pH of the blend to approximately 3.25.

6. A method for producing a colored fruit juice blend of selected flavor adapted for storage in tin-lined containers which includes mixing selected fruit juices to approximate the selected flavor, adding edible agents to said juice mix to achieve said selected flavor and adjust the pH of the mix to a point below pH 4.2, adding a sufficient quantity of erythrosine to the adjusted mix to impart a desired color thereto and blending said mix.

7. The method of claim 6 wherein a buffering agent is added to said juice mix to adjust the pH thereof to approximately 3.25.

8. A method for producing a pink pineapple-grapefruit juice blend of selected flavor adapted for storage in tin-lined containers which includes testing grapefruit juice and pineapple juice to determine sweetness and acidity, mixing the tested pineapple and grapefruit juice with edible acidic and sweetening agents to achieve the selected flavor, adjusting the pH of said mix within a pH range of 3.1 to 3.6, adding a sufficient quantity of erythrosine to the adjusted mix to impart a pink color thereto, blending the mix and pasteurizing the resultant blend.

References Cited

UNITED STATES PATENTS 2,686,722  8/1954  Goldstein _____ 99—148
2,831,773  4/1958  Geisler _____ 99—148

OTHER REFERENCES

Jacobs: "Manufacture and Analysis of Carbonated Beverages," Color and Coloring, Chemical Publishing Co. Inc., New York, 1959, pp. 185–186.

Jacobs: "Food Adjuncts," Synthetic Coloring Matters, D. Van Nostrand Co. Inc., New York (1947), p. 22.

LIONEL M. SHAPIRO, *Primary Examiner.*

J. M. HUNTER, *Assistant Examiner.*

U.S. Cl. X.R.

99—148